May 8, 1934.  R. A. GREENE  1,958,301
APPARATUS FOR COOLING COFFEE, ETC
Filed July 1, 1932  3 Sheets-Sheet 1
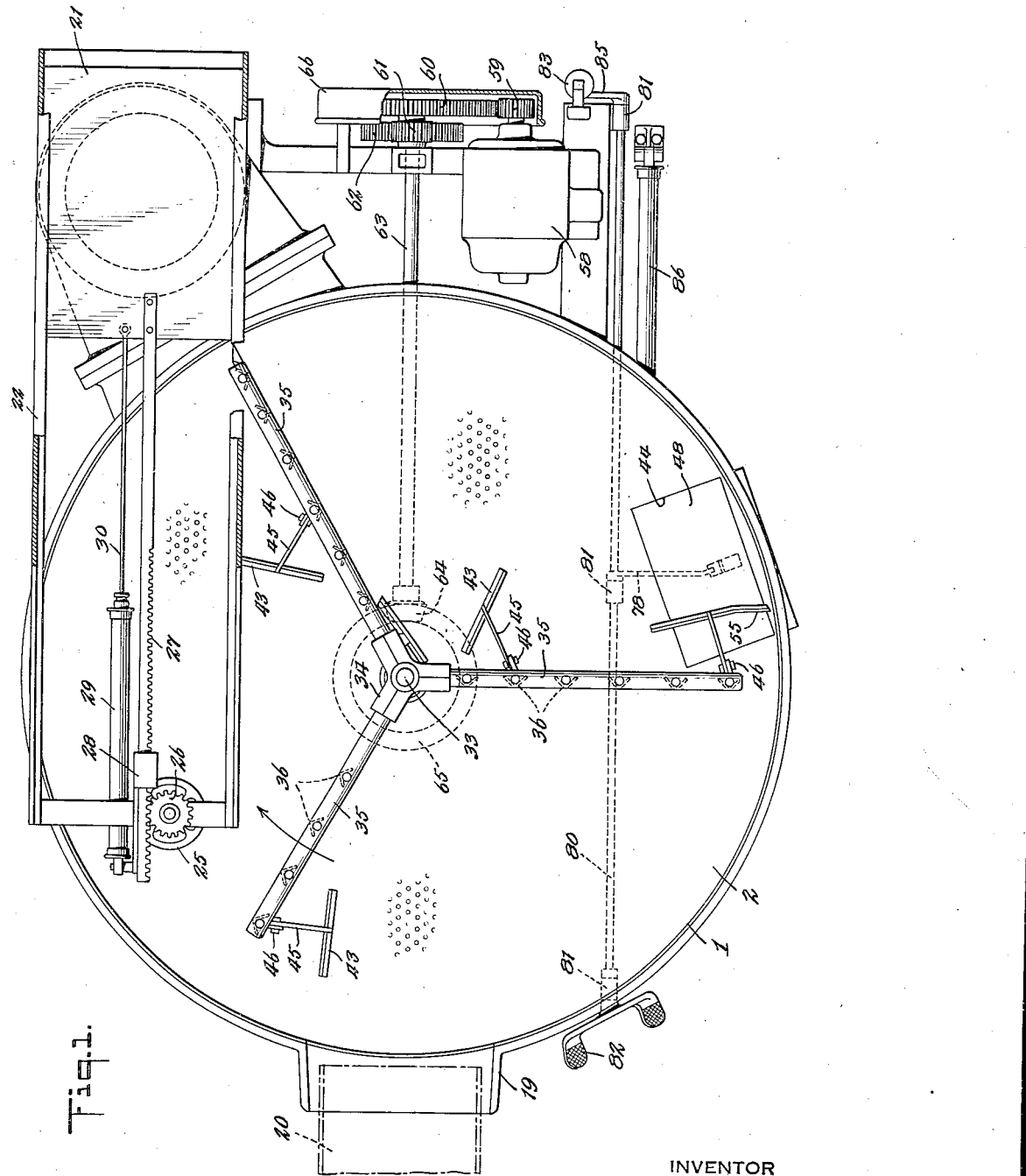
INVENTOR
RICHARD A. GREENE
BY
*J. S. Wooster*
ATTORNEY

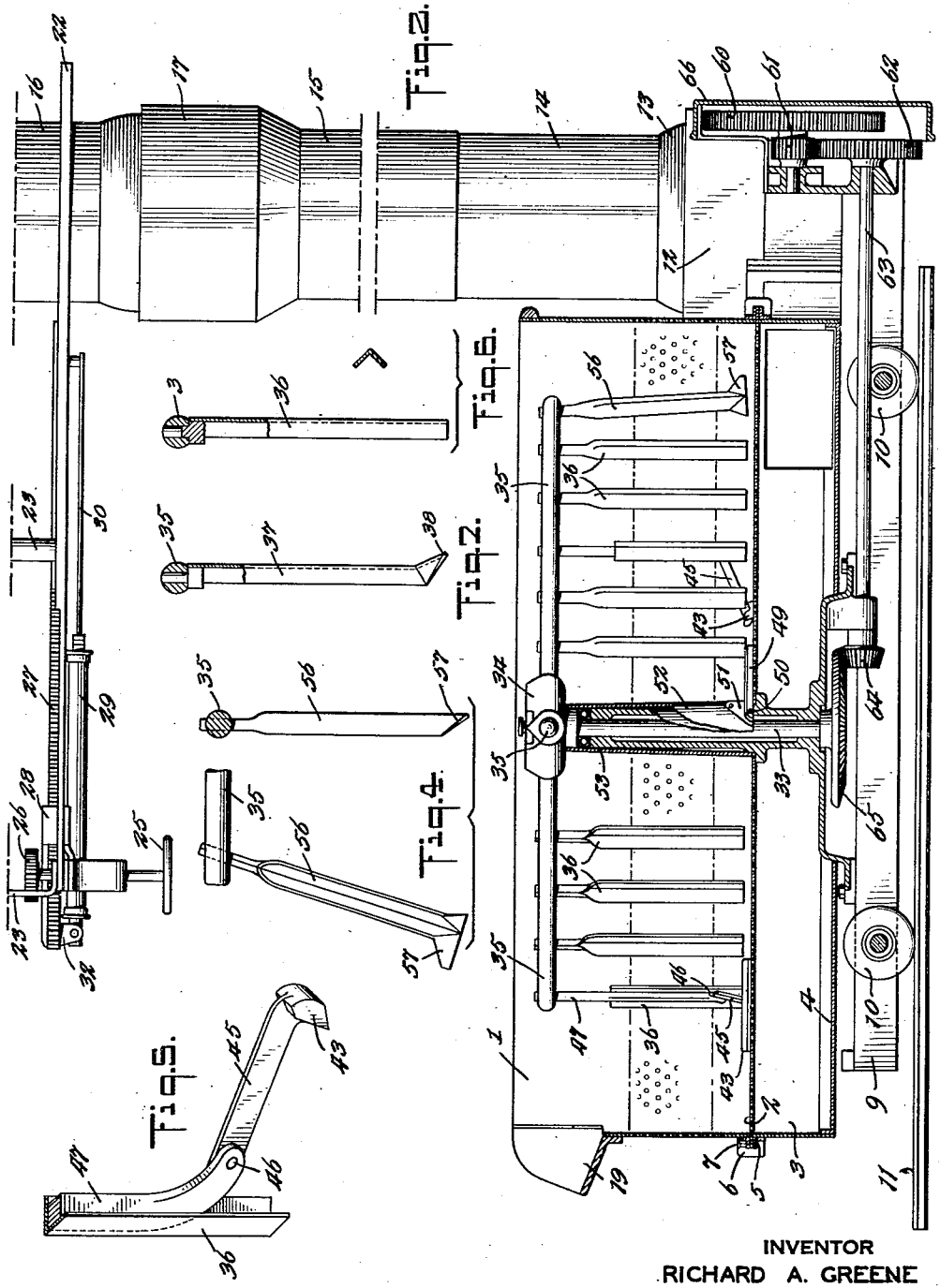

May 8, 1934.  R. A. GREENE  1,958,301
APPARATUS FOR COOLING COFFEE, ETC
Filed July 1, 1932  3 Sheets-Sheet 3
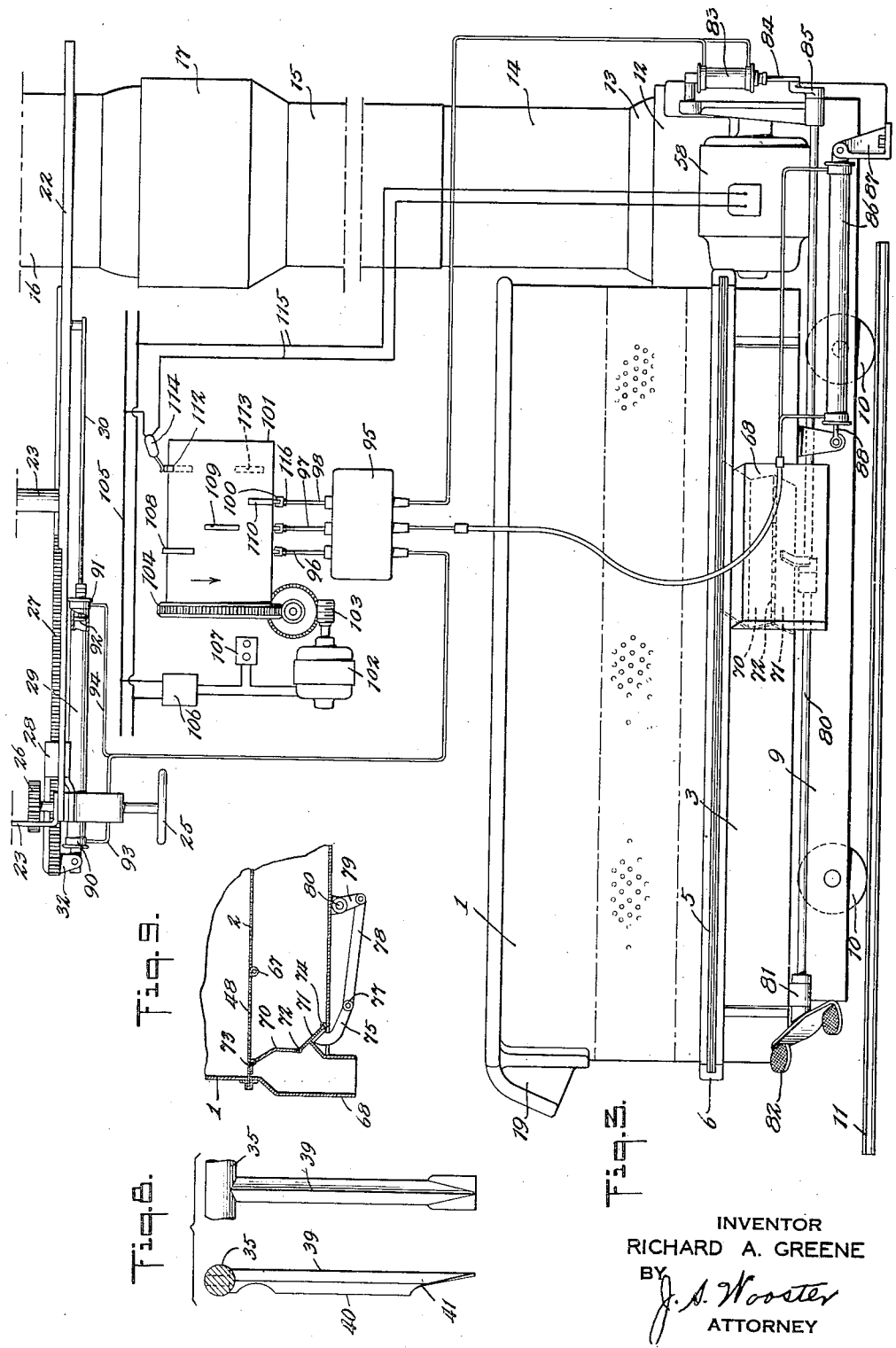
INVENTOR
RICHARD A. GREENE
BY
J. S. Wooster
ATTORNEY Patented May 8, 1934

1,958,301

UNITED STATES PATENT OFFICE 1,958,301

APPARATUS FOR COOLING COFFEE, ETC.

Richard A. Greene, Brooklyn, N. Y., assignor to Jabez Burns & Sons, Inc., New York, N. Y., a corporation of New York Application July 1, 1932, Serial No. 620,441

5 Claims. (Cl. 34—23)

This invention relates to apparatus for cooling coffee or other materials, which are first heated or roasted to a certain degree and then require rapid cooling to prevent further physical and chemical changes.

The invention is not only applicable to the cooling of coffee, but also to the treatment of roasted cocoa beans, peanuts or cereals, wherever rapid cooling is desired to stop or control the action of heat on the material.

The objects of the invention are to cool such materials more thoroughly and uniformly than heretofore, to provide a novel arrangement of stirrers for agitating the material to be cooled while continuously aiding the distribution of air through the mass, to provide improved means for quickly emptying the device when the cooling operation is completed, and to perform these operations automatically in accordance with a predetermined time cycle if desired.

It is the aim of all roasters of coffee to turn out a product as nearly uniform as possible in appearance and quality. At the moment when the goods are fully roasted they are extremely hot, and unless quickly cooled they will continue roasting and consequently darken in color and change their characteristics such as their flavor, uniformity, etc. It is therefore customary to discharge the roasted coffee into a cooler box or car having a perforated bottom and a suction chamber below the bottom connected to an exhaust main. The box is usually mounted on wheels, so that it can be moved away from the roaster while the coffee is being cooled by the exhaust, and the box is then emptied and brought back to the roaster for another charge.

One difficulty with previous coolers of this type has been that they do not cool the coffee uniformly. The air which is drawn downwardly through the mass of beans cools the upper layers quickly, but in doing so it becomes heated and prolongs the time required to cool the beans in the lower strata. As a result, the parts which remain heated continue to roast and are darker in appearance than the parts that have cooled promptly. For this reason it is customary to stir the beans either manually, as by means of shovels, or mechanically, by means of rotatable rods or paddles, in order to expose all parts of the charge to the cool air. Mechanical stirring has been ineffective because the beans immediately fall back into the spaces formed in the wake of the stirrers, so that the cool air does not directly reach the beans in the lower strata. With manual stirring, no matter how vigorous, uniform cooling does not take place because the operator is constantly changing the level and depth of the mass and since the air goes through the thin portions rapidly and the thicker portions more slowly, the former cool quickly and the latter remain heated.

In Patent #1,870,355 of W. G. Burns and R. A. Greene, issued August 9, 1932, uniformity of cooling is obtained by a novel construction and arrangement of rotatable stirrers which continuously lift the beans off the bottom of the cooler, where they tend to remain hot, and also provide air spaces back of each stirrer which allow cool streams of air to penetrate to a considerable distance below the upper strata of material as the stirrers advance through the mass of beans. The streams of cool air which are thus continuously drawn down into the intermediate portions of the mass dilute the already hot air stream and cool it. The air streams thus have the same effect as though the mass of material were spread out in a thin layer of much greater area.

An important feature of the present invention resides in novel means employed to stir and level the material during the cooling operation and to empty the cooler quickly after the cooling is completed. This preferably comprises a rotatable movably mounted sweeping member or a plurality of such members each so mounted forward of its advancing face and relatively to its lower edge as to automatically rise in the material above the bottom of the cooler during the cooling operation and to convey the material into a discharge opening in the bottom at the conclusion of the cooling operation. In the preferred form of the invention I use metal scrapers which are pivoted to rods or to rotatable stirrers of the type disclosed in the above Burns and Greene patent and are dragged along in back of the rods or stirrers during the cooling operation. When the cooler is filled with coffee or other material, the mass inertia of the beans will cause the rotating scraps to swing up on their pivots as a result of their contact with the beans and rise off the bottom of the cooler. As the rods or stirrers continue to rotate they will drag the scrapers along in this position, stirring and leveling the material. Since the scrapers are raised off the bottom of the cooler they avoid any tendency to break the material which is being cooled, and they also have a very desirable agitating effect which accelerates the cooling operation. The discharge opening in the bottom of the cooler is normally closed by a door, and when this door is opened the material pours out, being conveyed toward the discharge opening by the scrapers, and, when the level of the material is sufficiently reduced to a point near the bottom of the receptacle, the scrapers descend by gravity and engage and scrape along the bottom of the cooler and completely empty it.

The cooler may be operated automatically, by automatic motors or switches which are operated in predetermined sequence and in accordance with a definite time cycle. In the preferred form of the invention this is accomplished by means of hydraulic or other automatic motors controlled by a rotatable member which may be set in motion at any desired time, or may be associated with an automatic roaster and operated automatically when the material reaches the desired roasting temperature as disclosed in application of W. G. Burns and R. A. Greene, Serial No. 618,002, filed June 18, 1932. The rotatable control member may be stopped at the conclusion of a predetermined time cycle, for example after discharging one batch of material, closing the discharge door in the bottom of the cooler, moving the cooler up to the roaster to receive another charge of roasted material, cooling the material and moving the cooler away from the roaster and up to the discharge point, although this sequence of operations may be varied.

In carrying out the invention, various novel combinations and sub-combinations in the cooling, stirring and discharging mechanisms have been used. These will be described in connection with the accompanying drawings, in which:

Fig. 1 is a plan view of a cooler box embodying the invention;

Fig. 2 is a side elevation of the cooler box with parts broken away to show the interior;

Fig. 3 is a side elevation showing the rotatable control member or cam drum and associated mechanism for operating the cooler box automatically;

Figs. 4 to 8 inclusive are detail views showing the construction and arrangement of various different stirrers and scrapers; and Fig. 9 is a sectional view through the discharge chute, showing the mechanism for opening the door in the bottom of the cooler box.

The cooler box shown in Figs. 1 to 3 is circular in form and comprises a cylindrical side 1, perforated flat bottom or plate 2, and lower suction chamber 3 having a bottom 4. The perforated plate 2 is attached to suction chamber 3, and the peripheral flanges 5 of side 1 and suction chamber 3 are mounted one on top of the other and clamped together by means of clamps 6. These clamps have set screws 7 which are set down hard against the upper flange 5, clamping the parts rigidly together. By loosening the set screws 7 in the clamps the upper part of the car can be rotated with respect to the suction chamber and it can be set in its proper position to receive goods from the roaster discharge spout.

Side 1 is preferably perforated to permit some fresh air to be drawn directly into the lower strata of the material to be cooled, and thereby aid in effecting more uniform cooling than is obtained when the air is drawn only through the top. These perforations, as well as the perforations in bottom 2, are of such size as to allow passage of air without passage of the coffee beans or other material being cooled. The cooler box is mounted on truck 9 having wheels 10 which travel on rails 11 extending from the front of the roaster to a floor hopper to receive the material after cooling.

Suction chamber 3 extends through the side of the cooler and has an opening leading into an upwardly turned and enlarged pipe 12. Pipe 12 is shaped to engage ball tube 13 which is attached to an upwardly extending pipe 14. The pipe 14 telescopes within another pipe 15 which is coupled to suction main 16 by means of ball-and-socket joint 17. This telescoping connection is similar to that disclosed in Patent 1,218,997 to R. A. Greene, issued May 13, 1917. In this way the cooler box may be moved freely between the roaster, where it receives a charge of hot roasted material, and the discharge point, without disconnecting it from the suction main or interrupting the cooling operation. To permit the cooler box to be filled, a portion of the side may be formed to provide a projecting lip 19 which is adapted to fit underneath the discharge chute 20 of a roaster as shown in Fig. 1.

Suction in telescoping pipes 14—15 causes air to be drawn downwardly through the mass of material in the cooler. Suction in the pipes is controlled by slide 21 which moves in frame 22 supported above ball-and-socket joint 17 by hangers or brackets 23. In Figs. 1 to 3 slide 21 is shown closed, and may be opened by moving it to the left until it uncovers the opening in the air pipe and thus allows the air to be drawn through.

Slide 21 is operated by hand wheel 25 carrying pinion 26 which meshes with rack 27 having one end connected to the slide. This rack slides in bearing 28 which is attached to frame 22. Hand wheel 25 may be pushed upwardly to raise pinion 26 out of engagement with teeth of rack 27 when the slide is to be operated automatically.

The slide is also operated by hydraulic motor or power cylinder 29 having power piston and piston rod 30 which is connected to the slide as shown in Figs. 2 and 3. Cylinder 29 is pivoted to lug 32 depending from frame 22, allowing the cylinder to adjust itself sufficiently to prevent slide 21 from binding in frame 22.

The cooler box is provided with a central shaft 33 carrying radial extensions 34 here shown to be three in number. Extensions 34 each support an arm 35 parallel with perforated bottom 2 as shown in Fig. 1. These arms each support a series of vertical stirrers 36 which reach down almost to bottom 2 but do not touch it. Stirrers 36 shown in Figs. 1, 2 and 6 are of V-shaped cross-section and are set with the sharp edges in front, thus providing hollow troughs or channels in back which are open to receive air from above the surface of the coffee or other material in the cooler.

Shaft 33, carrying arms 35 and stirrers 36, is rotated in a clockwise direction as viewed in Fig. 1, causing the forward sharp edges of the stirrers to plow through the beans and turn them over, and push them aside. In the short time required for the beans to fill the spaces left by the stirrers, a current of air is drawn through the troughs or V-shaped channels of the stirrers and part-way through the mass of beans. The main stream of air, which is drawn through the upper strata of material, becomes heated by contact with the beans, and the addition of cold air at a point between the upper and lower layers dilutes the already heated air stream and cools it. The point at which the air is drawn behind the stirrers depends upon their shape and speed of rotation. The two air streams have the same effect as though the mass of material were spread out in a thin layer of much greater area.

Figs. 7 and 8 show two different forms of stirrers which may be used in place of stirrers 36. Stirrer 37, shown in Fig. 7, is similar to stirrers 36 except that it has its lower end terminating in transverse flat edges 38 inclined downwardly toward the bottom of the cooler. These inclined flat edges lift the beans off the perforated bottom 2 as the stirrers rotate. Stirrer 39 shown in Fig. 8 is similar to that shown in Fig. 7, except that the air channel at the rear is of hollow section 40, and has the lower portion cut away at 41 so that air is drawn through the hollow section to the lower stratum of material and passes down through it.

The cooler is also provided with a plurality of sweeping members or scrapers 43 which assist in stirring and leveling the material, and also serve to propel it toward discharge opening 44 in the bottom 2 at the conclusion of the cooling operation. These scrapers may be made of iron, bronze, aluminum or any other suitable material and preferably consist of bars having stems 45 which are pivoted at 46 to vertical rods 47 carried by the rotatable arms 35, although brushes may be employed instead of scrapers if desired. Rods 47 are also utilized to support stirrers 36 as shown in Fig. 5. Scrapers 43 are so distributed, and are arranged at such angles that they sweep over the entire bottom of the cooler and cooperate to convey the material toward the outermost scraper which rotates in a path which includes discharge opening 44.

The scrapers 43 having inclined advancing faces and are of such size, shape and weight and are so hinged that when the cooler is filled with coffee or other material, the mass inertia of the beans causes the rotating scrapers to swing up on their pivots 46 and rise off the bottom of the cooler. As arms 35 continue to rotate they drag the scrapers along in this position, stirring and leveling the material. Discharge opening 44 is normally closed by perforated door 48; and when this door is opened the material passes through opening 44, being conveyed toward it by the scrapers. When the level of the beans is sufficiently reduced, the scrapers fall by gravity, scrape along the bottom of the cooler and convey the material through opening 44 until the cooler is completely emptied.

In the arrangement shown in Fig. 2 there is an innermost scraper 49 pivoted at 50 to support 51 which is secured to an extension 52 of sleeve 53 which surrounds shaft 33 and rotates therewith. Scraper 49 is arranged at an angle to sweep the beans away from the shaft sleeve. Outermost scraper 43 is bent at 55 at an angle to sweep the material into discharge opening 44, as shown in Fig. 1. Outermost stirrer 56 shown in Fig. 4 is similar to stirrers 36 except that it is inclined outwardly toward the side of the cooler box and has its lower end flattened into a broad paddle 57 which is shaped to sweep the material away from the edge where the side 1 joins the bottom 2. The number and arrangement of scrapers may be varied, and a complete set of scrapers might be attached to one rotating arm although the stirring would not be as effective and such arrangement would also tend to create waves in the mass of material being cooled. For most efficient operation I therefore prefer to arrange the scrapers among the arms 35 as shown in Figs. 1 and 2.

The stirring mechanism is driven by an electric motor 58 having pinion 59 which meshes with gear 60 mounted on a stub shaft which also carries pinion 61. Pinion 61 meshes with gear 62 carried by shaft 63. At its opposite end shaft 63 carries beveled pinion 64 which meshes with beveled gear 65 secured to the lower end of vertical cooler shaft 33. The pinions 59 and 61 and gears 60 and 62 are enclosed in a suitable guard casing 66. The electric circuit of the motor is controlled by a cam drum as hereinafter described.

Discharge opening 44, as previously stated, is normally closed by door 48 in the form of a perforated plate hinged at 67 to bottom 2. Beneath this door is a chute 68. The door is operated by a toggle consisting of plates 70 and 71 hinged at 72, plate 70 being hinged to door at 73 and plate 71 being hinged to the frame of the cooler at 74, as shown in Figs. 3 and 9.

The toggle is controlled by a system of levers comprising arm 75 having one end rigidly attached to plate 71 and the other end fulcrumed at 77 to link 78. The opposite end of link 78 is fulcrumed to crank 79 which is rigidly secured to shaft 80 journaled in brackets 81 and extending underneath the cooler as shown in Figs. 1 and 3. Shaft 80 is rotated by foot treadle 82 to open and close door 48. When door 48 is open it rests against the inclined bottom wall of chute 68, with plates 70 and 71 folded under the door. This construction permits door 48 to be opened or closed instantly with no danger of accidental opening due to the weight of the material or to other causes. When closed, however, plates 70 and 71 form a gate beneath the door and between the sides of chute 68 so that air can enter the suction chamber only through perforated bottom 2.

Door 48 is also operated by power cylinder 83 having power piston and piston rod 84 pivoted to a lever 85 the opposite end of which is rigidly attached to shaft 80 as shown in Figs. 1 and 3. Operation of power cylinder 83 causes shaft 80 to rotate in one direction or the other, thus opening or closing door 48 as the case may be. When foot treadle 82 is used to open the door, piston rod 84 should be disconnected from lever 85. When operating automatically, however, it is not necessary to disconnect the foot treadle from shaft 80.

Movement of the cooler box is controlled by power cylinder 86 which is secured to stationary bracket 87 and is provided with power piston and piston rod 88 having its outer end secured to the cooler box.

It will be seen that there are three power cylinders in the apparatus described above; power cylinder 29 operating air slide 21, power cylinder 83 operating discharge door 48 in the bottom of the cooler, and power cylinder 86 controlling the movement of the cooler box to and from the roaster. The hydraulic system for operating these power cylinders in predetermined sequence is preferably of the type disclosed and claimed in Burns and Greene application Serial No. 618,002, filed June 18, 1932, to which reference is made. In the present application I have disclosed only as much of the hydraulic system as is necessary for a complete understanding of the invention. Inasmuch as all the power cylinders are alike in general construction and operation, I shall describe the power cylinder 29 and associated connections which will be treated as representative of all the power cylinders.

Power cylinder 29 shown in Fig. 3 has cylinder heads 90 and 91, and contains power piston 92 secured to piston rod 30 which extends through suitable packing in head 91. Hydraulic tubes 93 and 94 are connected to ducts in the respective cylinder heads 90 and 91. In the position shown in Fig. 3 the oil or other liquid in the hydraulic system has been forced through tube 93 into the cylinder 29, thus moving piston 92 and piston rod 30 to the right as viewed in Fig. 3. In order to move the piston and piston rod to the left, it is necessary to reverse the direction of the liquid by releasing the pressure in tube 93 and forcing the liquid through tube 94.

Pressure in tubes 93 and 94 is controlled by a valve which is one of a number of valves in valve chest 95. This chest has suitable inlet and outlet chambers and contains a plurality of open-ended valve bodies each of which is provided with a piston. In the form shown in the drawings, there are three valve bodies and three pistons in valve chest 95, and these pistons have respective piston rods 96, 97 and 98. The outer ends of these piston rods are provided with rollers 100 which are adapted to contact with a rotatable cam drum 101 which is rotated by an electric motor 102. The motor shaft is connected by suitable reduction gears 103 to worm gear 104 on the periphery of the cam drum. The operating circuit of the motor 102 is connected to a power line or other source of current 105 and contains a suitable starter 106 and a push button or other control switch 107.

Rotation of drum 101 is in the direction of the arrow in Fig. 3. The surface of the drum contains a plurality of raised cams 108, 109 and 110, one for each of the respective piston rods 96, 97 and 98 in valve chest 95. In addition to cams 108, 109 and 110, drum 101 also contains a spaced pair of cams 112 and 113 for operating a mercoid switch 114 which controls energizing circuit 115 of cooler motor 58. It will be understood that the hydraulic system also contains a suitable hydraulic pump, pump motor, oil storage tank, air tank and other adjuncts of the hydraulic system which are omitted from the drawings in order to simplify the showing.

The time during which the various power cylinders, and the mercoid switch, remain operative depends upon the length of the respective cams which are arranged in advance to effect the desired operation. Fig. 3 shows the general arrangement, length and relation of each of the cams to each other, and to the respective piston rods and mercoid switch, but it will be understood that this arrangement is merely illustrative and is not drawn to scale. It will also be understood that the location of the cams may be varied, and that their positions and lengths may be changed to vary the sequence of operations and the time period involved.

When coffee is dumped from the roaster into the cooler, the operator closes switch 107, thus energizing the motor 102 and rotating drum 101 in the direction of the arrow in Fig. 3. As the drum rotates, the various cams 108, 109, etc., will arrive in prearranged sequence underneath rollers 100 on the ends of respective piston rods 96, 97, etc., and the rollers will ride up on the cams and depress the piston rods. This movement of each individual piston rod operates the associated piston in valve chest 95, thus reversing the direction of the fluid in the associated power cylinder as previously described. As the drum continues to rotate each cam will leave the roller of its associated piston rod, whereupon spring 116 will force piston rod and roller 100 against the surface of drum 101.

Manual operation of push button switch 107 starts cam drum motor 102, and in the arrangement shown in Fig. 3 the following operations will take place, in the order named, from the time the drum starts rotating:

1. Cam 112 tips mercoid switch 114, operating motor 58 which rotates the stirrers and sweeping members in the cooler.
2. Cam 110 depresses piston rod 98, forcing the piston of power cylinder 83 outwardly. This opens door 48 in the bottom of the cooler and permits the material to be discharged.
3. Cam 110 releases piston rod 98, causing piston rod 84 to be drawn into power cylinder 83 and thus closing door 48 after the material is discharged.
4. Cam 112 passes by mercoid switch 114 which breaks the energizing circuit of motor 58 and stops the rotation of the stirrers and sweeping members.
5. Cam 109 depresses piston rod 97, forcing the piston of power cylinder 86 outwardly, thus moving the cooler car close to the roaster discharge chute 20 as indicated in Fig. 1.
6. Cam 113 tips mercoid switch 114, again operating motor 58 and rotating the stirrers and scrapers in the cooler.
7. Cam 108 depresses piston rod 96, causing piston rod 30 to be drawn into power cylinder 29. This opens air slide 21 and allows air to be drawn through air pipes 14—15 to cool the coffee.
8. After the cooler is charged with coffee or other material, cam 109 releases piston rod 97, causing piston rod 88 to be drawn into power cylinder 86 thus moving the cooler away from the roaster up to the discharge point.
9. Cam 113 passes off mercoid switch 114 which tips downwardly and deenergizes motor 58, stopping the rotation of the stirrers and sweeping members in the cooler.

Following this operation, cam drum motor 102 is preferably deenergized by manual operation of push button switch 107, stopping the rotation of cam drum 101 for a suitable length of time while the material is cooling. When the material has cooled sufficiently, and is ready to be discharged, the operator again closes push button switch 107, energizing motor 102 and rotating drum 101. Cam 108 will thereupon ride off the piston rod 96, closing air slide 21, and the above cycle of operations will be repeated, starting with operation #1 which energizes the cooler motor 58 for the purpose of discharging the cooled material.

It will be evident that all of the operations described herein may be performed or controlled by hand, from the time the material enters the cooler until it is discharged in a cooled state. When operating manually, the piston rods of the various power cylinders are disconnected and the various parts operated by hand as previously described.

It will also be evident that various changes may be made in the details of construction and method of operation herein described, without departing from the scope and spirit of the invention as defined in the appended claims.

The invention claimed is:

1. The combination with a receptacle adapted to contain a mass of roasted coffee or other material to be cooled and having a cylindrical side and a bottom containing a discharge door adjacent the peripheral edge, of means for drawing air downwardly through said receptacle, a plurality of rotatable arms in said receptacle, a plurality of stirrers on said arms extending downwardly into said receptacle and having troughs on their rear sides open to the air above the surface of the material and shaped in front to spread the material apart so as to create air spaces extending into the interior of the mass of said material from the surface thereof through which air may be drawn by said drawing means into the interior of said mass without passing through layers of the material to dilute the air which has become heated by contact with the material, and a plurality of sweeping members arranged to drag on the bottom of said receptacle to discharge material through said door when the latter is opened, said sweeping members being pivoted to said stirrers rearwardly of said troughs to permit said sweeping members to rise off the bottom of said receptacle to stir the material during cooling and to descend by gravity when the level of the material is sufficiently reduced.

2. Apparatus for cooling coffee and other materials, comprising a receptacle having a cylindrical side and a flat perforated bottom containing a discharge opening adjacent the outer periphery, an air main, a pipe connected between said air main and said receptacle, a slide in said pipe controlling the passage of air through the perforated bottom of said receptacle, a door for said discharge opening adapted to lie flush with the bottom of said receptacle when closed and adapted to open downwardly to discharge the material from said receptacle, a plurality of rotatable sweeping members arranged to drag on the bottom of said receptacle to discharge said material through said discharge opening when said door is opened, said sweeping members each being pivoted forward of its advancing face and relatively to its lower edge to automatically rise in the material above the bottom of said receptacle when said door is closed, a plurality of movable parts for operating said slide, door and rotatable sweeping members, a control member operable in definite time cycles, and means operated by said control member for operating said movable parts in predetermined sequence during a time cycle.

3. A traveling cooler box for cooling coffee and other materials, comprising a receptacle having a cylindrical slide and a flat perforated bottom containing a discharge opening adjacent the outer periphery, an air main, an extensible pipe connected between said air main and said cooler box to permit variation of the distance between said air man and said box, a slide in said pipe controlling the passage of air through the perforated bottom of said car, a door for said discharge opening adapted to lie flush with the bottom of said receptacle when closed and adapted to open downwardly to discharge the material from said receptacle, a plurality of rotatable sweeping members arranged to drag on the bottom of said receptacle to discharge said material through said discharge opening when said door is opened, said sweeping members each being pivoted forward of its advancing face and relatively to its lower edge to automatically rise in the material above the bottom of said receptacle when said door is closed, a plurality of movable parts for moving said cooler box and for operating said slide, door and rotatable sweeping members, a control member operable in definite time cycles, and means operated by said control member for operating said movable parts in predetermined sequence during a time cycle.

4. Apparatus for cooling and discharging coffee, cocoa beans, peanuts and cereals, comprising a circular receptacle having means for drawing a cooling fluid through the receptacle and through the material to be cooled therein and having a discharge door, and a rotatable sweeping member arranged to engage and sweep the bottom of said receptacle to discharge cooled material through said door when the latter is opened, and the level of the material drops to a point close to the bottom of the receptacle, said member having an inclined advancing face and being of such size, shape and weight and so pivotally mounted forward of said advancing face and relative to its lower edge as to be embedded in the material and to rise automatically above the bottom of said receptacle as a result of the contact with the material being cooled when rotated with the discharge door closed and when there is a body of material in the receptacle, whereby to disperse the cooling fluid through the material.

5. Apparatus for cooling and discharging coffee, cocoa beans, peanuts and cereals, comprising a circular receptacle having means for drawing a cooling fluid through the receptacle and through the material to be cooled therein and having a discharge door, and a rotatable sweeping member arranged to engage and sweep the bottom of said receptacle to discharge cooled material through said door when the latter is opened, and the level of the material drops to a point close to the bottom of the receptacle, said member having an inclined advancing face and being of such size, shape and weight and so pivotally mounted at a point below the top of the receptacle forward of said advancing face and relative to its lower edge as to be embedded in the material and to rise automatically above the bottom of said receptacle as a result of the contact with the material being cooled when rotated with the discharge door closed and when there is a body of material in the receptacle, whereby to disperse the cooling fluid through the material.

RICHARD A. GREENE.